United States Patent Office 3,715,318
Patented Feb. 6, 1973

3,715,318
FLUIDIZED BED PRODUCTION OF URANIUM MONOCARBIDE AND URANIUM MONOCARBIDE-URANIUM ALUMINIDE MIXTURES
George W. Hogg, Idaho Falls, Idaho, assignor to the United States of America as represented by the United States Atomic Energy Commission
Filed Jan. 28, 1971, Ser. No. 110,760
Int. Cl. C09k 3/00
U.S. Cl. 252—301.1 R         8 Claims

ABSTRACT OF THE DISCLOSURE

Uranium-dioxide-coated aluminum particles in a fluidized bed can be converted to particles of substantially pure uranium monocarbide or particles with a composition comprising a mixture of uranium monocarbide and uranium aluminide by fluidizing the bed with a mixture of carbon tetrachloride and chlorine in varying percentages with argon gas for 1 to 2 hours at a temperature of 320° C. and subsequently fluidizing the bed with argon alone for 1 to 2 hours at a temperature of 800° C.

CONTRACTURAL ORIGIN OF THE INVENTION

The invention described herein was made in the course of, or under, a contract with the United States Atomic Energy Commission.

BACKGROUND OF THE INVENTION

This invention relates to a process for producing uranium carbide. More specifically, the invention relates to a fluidized bed process for producing particles of uranium monocarbide or particles with a composition comprising a mixture of uranium monocarbide and uranium aluminide.

The basic fluidized bed method for producing uranium aluminide is disclosed in U.S. Pat. 3,318,670, issued to E. S. Grimmett May 9, 1967 and assigned to the assignee of the present application. By this method, substantially spherical particles of aluminum are charged in a reactor and fluidized with air. After heating the reactor to 350° C., an aqueous solution of uranyl nitrate is sprayed onto the bed. The uranyl nitrate decomposes to uranium trioxide which is deposited as a coating on the aluminum particles. The decomposition of the coating continues until a proper weight ratio of uranium to aluminum is obtained. The uranium trioxide so formed is then reduced by introducing ethanol or methanol vapor into the reactor with argon as a fluidizing gas at 350° C. This creates uranium-dioxide-coated aluminum particles. The uranium dioxide so formed is then chlorinated by introducing carbon tetrachloride vapor with the argon fluidizing gas at the same temperature, thereby converting the uranium dioxide to uranium tetrachloride. Following chlorination, fluidization with argon is continued and the reactor is heated to 600° C. which causes the uranium tetrachloride coating to react with the aluminum core to produce substantially pure uranium aluminide particles and gaseous aluminum trichloride which is exhausted with the off-gases.

Uranium carbide, like uranium aluminide, is of considerable interest for use as a fuel material for nuclear reactors. Uranium carbide-uranium aluminide mixtures are also under such consideration. Various known methods for producing uranium carbide require temperatures greater than 1300° C. Some also require that uranium dioxide be initially reduced to costly uranium metal. Moreover, these methods do not produce uranium monocarbide-uranium aluminide mixtures.

The above-described fluidized bed process was not designed nor used to produce substantially pure uranium monocarbide or mixtures of uranium monocarbide and uranium aluminide. However, while utilizing this fluidized bed process, making various changes in the process in an attempt to increase the conversion of uranium tetrachloride to uranium aluminide, I discovered that by altering this process somewhat, spherical particles of substantially pure uranium monocarbide as well as particles with a composition comprising a mixture of uranium monocarbide and uranium aluminide can be produced rather than particles of uranium aluminide.

Therefore, it is one object of this invention to provide a process for producing uranium carbide.

It is another object of this invention to provide a process for producing uranium monocarbide.

It is a further object of this invention to provide a process for producing mixtures of uranium monocarbide and uranium aluminide.

It is yet another object of this invention to provide a process for producing particles of substantially pure uranium monocarbide in a fluidized bed.

Finally, it is an object of this invention to provide a process for producing particles of substantially pure uranium monocarbide in a fluidized bed at temperatures substantially lower than those previously required by other uranium monocarbide production processes.

SUMMARY OF THE INVENTION

While attempting to increase the conversion of uranium tetrachloride to uranium aluminide in the fluidized bed process of producing uranium aluminide, I discovered that particles of substantially pure uranium monocarbide as well as particles of uranium monocarbide-uranium aluminide mixtures can be produced by fluidizing uranium-dioxide-coated aluminum particles with a mixture of carbon tetrachloride and chlorine in varying percentages in argon gas at 320° C. for 1 to 2 hours, thereby converting the uranium dioxide to uranium tetrachloride, volatilizing carbon dioxide and depositing residual carbon on the fluidized particles. Subsequently, the bed is fluidized with argon alone at 800° C. for 1 to 2 hours, thereby causing the uranium tetrachloride to react with the residual carbon to form uranium monocarbide, and any unreacted uranium tetrachloride remaining after complete utilization of the residual carbon reacts with the aluminum core to form uranium aluminide.

DETAILED DESCRIPTION OF THE INVENTION

In practicing the present invention, a fluidized bed containing uranium-dioxide-coated aluminum particles is fluidized with a mixture of carbon tetrachloride and chlorine in argon gas at a temperature of 320° to 380° C., the preferred temperature being 320° C. The fluidized bed of uranium-dioxide-coated aluminum particles may be created in any manner. However, one prefererd method is the process described in the cited U.S. Pat. 3,318,670. The fluidizing mixture may vary in composition from 20% carbon tetrachloride ($CCl_4$) and 80% chlorine ($Cl_2$) to 100% $CCl_4$, depending upon the desired composition of the resultant product. A fluidizing mixture of 100% $CCl_4$ in argon will result in particles of substantially pure uranium monocarbide (UC). As $Cl_2$ is included in the fluidizing mixture, the resultant product comprises particles with a mixed composition of UC and uranium aluminide ($UAl_x$). The maximum amount of $Cl_2$ which can be included in the fluidizing mixture and still obtain a resultant product of substantially pure UC is 25% $Cl_2$ with 75% $CCl_4$. At percentages above 25% $Cl_2$, the greater the percentage of $Cl_2$ in the fluidizing mixture, the greater the percentage of $UAl_x$ in the resultant particle composition. If the $Cl_2$ percentage of the fluidizing mixture is greater than 80%, UC will not form at all.

When the uranium-dioxide-coated aluminum particles are fluidized with the $CCl_4$-$Cl_2$ mixture as described above, the uranium dioxide ($UO_2$) is converted to uranium tetrachloride ($UCl_4$), carbon dioxide and phosgene ($COCl_2$) are volatilized and residual carbon is deposited on the $UCl_4$ coating. This depositing of residual carbon is essential to the present process, for it is this residual carbon which will subsequently react with the $UCl_4$ to form UC. The greater the amount of carbon deposited on the $UCl_4$ coating, the greater the percentage of $UCl_4$ which will subsequently react with the carbon to form UC. If sufficient carbon is deposited, all $UCl_4$ will react to form UC, as explained later in this specification.

The amount of residual carbon deposited on the $UCl_4$ coating is dependent upon the amount of time required to convert all the $UO_2$ to $UCl_4$ when fluidizing with the $CCl_4$-$Cl_2$ mixture. The greater the time required to convert all the $UO_2$, the greater the amount of residual carbon deposited on the $UCl_4$ coating. The amount of time necessary to convert all the $UO_2$ to $UCl_4$ is itself dependent upon three variables, these being the length of time and rate of fluidization, the temperature of fluidization, and the percentage of chlorine in the fluidizing mixture.

The length of time and rate of fluidization must be sufficient to allow complete conversion of all $UO_2$ to $UCl_4$. If complete conversion does not occur, any remaining unreacted $UO_2$ will form aluminum oxide ($Al_2O_3$) during the second fluidization step of this process. Continued fluidization with $CCl_4$-$Cl_2$ mixture after all $UO_2$ has been converted to $UCl_4$ will simply increase the amount of residual carbon deposited on the $UCl_4$ coating. However, too much residual carbon deposited on the particles might result in the formation of some uranium dicarbide ($UC_2$) during the second fluidization step. Therefore, while the length of time and rate of fluidization could depend on the desired final product as well as the temperature of fluidization and the composition of the fluidizing mixture, approximately 1 to 2 hours at a rate of about 4.5 cc. liquid $CCl_4$/min. per s.c.f.m. of fluidizing gas is preferred for all fluidizing mixtures, varying instead the composition of the fluidizing mixture to achieve different resultant particle compositions.

The temperature of fluidization will also control the time required for complete conversion of all $UO_2$ to $UCl_4$. Although there has been no actual optimization of the temperature range, the temperature should be between 320° and 380° C. Below 320° C., conversion to $UCl_4$ is extremely slow. At temperatures above 380° C., $CCl_4$ and $Cl_2$ begin reacting with the aluminum in the fluidized particles to emit aluminum chloride ($AlCl_3$), and uranous oxychloride ($UOCl_2$) is produced rather than $UCl_4$. The preferred temperature for all fluidizing mixtures is 320° C.

The final factor controlling the length of time required for complete conversion of $UO_2$ to $UCl_4$ is the amount of $Cl_2$ in the fluidizing mixture. This is the most important and controlling of the three factors. When the fluidizing mixture comprises 100% $CCl_4$, conversion of $UO_2$ to $UCl_4$ occurs at a sufficiently slow rate to allow 4 to 6 weight percent residual carbon to be deposited on the $UCl_4$ coating. Stoichiometrically, 4 weight percent residual carbon is sufficient to obtain complete conversion of $UCl_4$ to UC during the second fluidization step of this process. When $Cl_2$ is present in the fluidizing mixture, the rate of $UO_2$ to $UCl_4$ conversion increases. Apparently, the presence of $Cl_2$ increases the rate of oxygen removal from $UO_2$ by providing an abundance of chlorine to react with the uranium of $UO_2$, thereby releasing oxygen to react with the carbon from $CCl_4$. Without such an abundance of chlorine in the fluidizing mixture, the chlorine of $CCl_4$ reacts slower with the uranium of $UO_2$. This causes a slower release of oxygen from $UO_2$ and therefore a slower oxygen reaction with carbon, resulting thereby in unreacted carbon depositing on the fluidized particles. The greater the percentage of $Cl_2$ in the fluidizing mixture, then, the less time required for complete conversion of $UO_2$ to $UCl_4$, resulting in less residual carbon being deposited.

Subsequent to the above-described fluidization, the $UCl_4$-coated aluminum particles are then fluidized with argon alone at a temperature of 700 to 900° C., 800° C. being the preferred temperature. The minimum temperature of 700° C. is critical, for if this second fluidization occurs at a temperature below 700° C., UC will not form at all. The particles are maintained at the stated temperature for 1 to 2.5 hours, 2 hours in the preferred embodiment. During this second fluidization step the residual carbon reacts with the $UCl_4$ to form UC, aluminum chloride ($AlCl_3$) being volatilized, according to the following reaction:

$$3C + 3UCl_4 + 4Al \rightarrow 3UC + 4AlCl_3 \qquad (1)$$

Any remaining unreacted $UCl_4$ due to insufficient residual carbon will react with the aluminum in the fluidized particles to form $UAl_x$. Therefore, by controlling the amount of residual carbon deposited on the fluidized particles, the composition of the resultant particles may be controlled to form any combination of UC and $UAl_x$ or substantially pure UC if sufficient carbon is allowed to be deposited. The amount of residual carbon deposited can be easily controlled by simply altering the percentage composition of the $CCl_4$-$Cl_2$ fluidizing mixture.

It is believed that when the residual carbon is deposited on the $UCl_4$-coated aluminum particles, the carbon is dispersed throughout the entire $UCl_4$ layer. While there is no direct evidence to support this theory, some evidence does suggest this. When only $CCl_4$ is used for fluidizing, all the $UCl_4$ is converted to UC. If the residual carbon were to be deposited only on the surface of the $UCl_4$ layer, the tendency would be for just the upper portion of the $UCl_4$ layer to react with the carbon. Thus, this evidence tends to at least suggest that the carbon is relatively evenly dispersed throughout the $UCl_4$ coating.

U.S. Pat. 3,318,670 discloses the use of $CCl_4$ as a fluidizing means for $UO_2$-coated aluminum particles to form substantially pure $UAl_x$. However, if the present process were to be carried out according to the reference patent's conditions, UC would not form at all. This is merely because the reference patent was not directed to the problem of forming UC and therefore did not realize that by fluidizing the particles in such a manner as to cause deposition of residual carbon on the particles, upon fluidizing with argon at a temperature of at least 700° C. which is significantly higher than that disclosed by the reference patent, the $UCl_4$ will react with the carbon rather than the aluminum, forming substantially pure UC or a mixture of UC and $UAl_x$ depending upon the fluidizing mixture's composition and fluidizing conditions. The reason for and the mechanism of uranium's reaction with carbon rather than aluminum at the higher temperature has not yet been determined.

In one experimental run, approximately 200 grams of $UO_2$-coated aluminum particles were fluidized for 2 hours at 320° C. with 100% $CCl_4$ in argon gas at a rate of 4.5 cc./min. in a 2-inch-diameter fluidized bed. Analytical examination of the resulting $UCl_4$-coated aluminum particles showed that approximately 6 weight percent carbon had been deposited on the particles. Subsequently, the bed was fluidized with argon alone at 800° C., maintaining that temperature for 2 hours. $AlCl_3$ vapors were emitted during this final fluidization. X-ray diffraction analysis of the final product particles indicated substantially pure UC with trace amounts of uranium trialuminide ($UAl_3$) and uranium trichloride ($UCl_3$). These impurities could be maintained within desired levels by adjusting operating conditions and stoichiometric ratios. There was essentially no loss of uranium.

If the 200 grams of uranium-dioxide-coated aluminum particles are fluidized for 2 hours at 320° C. with a mixture of 50 mol percent $CCl_4$ and 50 mol percent $Cl_2$ in argon as at a rate of 4.0 to 4.5 cc. liquid $CCl_4$/min., approximately 2 weight percent carbon is deposited on the UCl$_4$-coated aluminum particles. If the bed is then fluidized with argon alone at 800° C. for a period of 2 hours, the resultant product particles have a composition of 50% UC and 50% UAl$_x$.

The present process has several additional advantages over alternate processes for forming UC. UC can be generated at temperatures as low as 700° C. in lieu of the 1300°–1800° C. necessary in other processes. The entire reaction process can be accomplished in a single vessel containing the fluidized bed, while avoiding the necessity of initially reducing the UO$_2$ to costly uranium metal. The fluidized bed process has inherent advantages of excellent heat transfer, and the form of the granular product is amenable to simplified handling and manufacturing processes. Finally, the data indicate that UC is selectively produced by this process, although uranium dicarbide (UC$_2$) might also be produced at higher temperatures.

It will be understood that the invention is not to be limited to the details given herein but that it may be modified within the scope of the appended claims.

The embodiments of the invention in which an exclusive property or privilege is claimed are defined as follows:

1. A fluidized bed process for producing particles containing uranium monocarbide comprising fluidizing a bed of uranium-dioxide-coated aluminum particles with a mixture of 20 to 100 percent carbon tetrachloride and 80 to 0 percent chlorine in argon at a temperature of 320° to 380° C. to convert all the uranium dioxide to uranium tetrachloride while volatilizing carbon dioxide and uniformly depositing residual carbon on said fluidized particles in amounts dependent upon the percentages of carbon tetrachloride and chlorine in said fluidizing mixture, and subsequently fluidizing the bed with argon alone at a temperature of 700° to 900° C. for 1 to 2.5 hours to react the uranium tetrachloride with the residual carbon to form particles containing uranium monocarbide, the proportion of uranium monocarbide in said particles being dependent upon the amount of residual carbon deposited on said fluidized particles.

2. The process according to claim 1 wherein said uranium-dioxide-coated aluminum particles are fluidized at a temperature of 320° C. for a period of 2 hours at the rate of 4.5 cc. liquid carbon tetrachloride/minute per s.c.f.m. of fluidizing gas.

3. The process according to claim 2 wherein said fluidized bed is subsequently fluidized with argon alone at a temperature of 800° C. for a period of 2 hours.

4. The process according to claim 3 wherein said fluidizing mixture comprises 75 to 100 percent carbon tetrachloride and 25 to 0 percent chlorine in argon and deposits sufficient residual carbon upon said fluidized particles to form particles of substantially pure uranium monocarbide.

5. The process according to claim 1 wherein the bed of uranium-dioxide-coated aluminum particles is fluidized with a mixture of 100 percent carbon tetrachloride in argon and said uranium tetrachloride subsequently reacts with said residual carbon at 700° to 900° C. to form particles of substantially pure uranium monocarbide while aluminum trichloride is volatilized.

6. The process according to claim 5 wherein said uranium-dioxide-coated particles are fluidized at a temperature of 320° C. for a sufficient period of time to deposit 4 to 6 weight percent residual carbon on said fluidized particles.

7. The process according to claim 6 wherein said uranium-dioxide-coated aluminum particles are fluidized por a period of 2 hours at the rate of 4.5 cc. liquid carbon tetrachloride/minute per scfm of fluidizing gas.

8. The process according to claim 7 wherein said fluidized bed is subsequently fluidized with argon alone at a temperature of 800° C. for a period of 2 hours.

References Cited

UNITED STATES PATENTS

| | | | |
|---|---|---|---|
| 3,288,571 | 11/1966 | Werner et al. | 23—347 |
| 3,294,877 | 12/1966 | Hammond | 264—.5 |
| 3,318,670 | 5/1967 | Grimm et al. | 23—347 |
| 3,391,999 | 7/1968 | Cole et al. | 23—347 |

STEPHEN J. LECHERT, JR., Primary Examiner

U.S. Cl. X.R.

264—.5; 423—256